(12) United States Patent
McAuliffe et al.

(10) Patent No.: US 9,739,902 B2
(45) Date of Patent: Aug. 22, 2017

(54) SYSTEM AND METHOD FOR REMAINING RESOURCE MAPPING

(71) Applicant: Chevron U.S.A. Inc., San Ramon, CA (US)

(72) Inventors: James McAuliffe, Houston, TX (US); Jowanna S. Neel, Richmond, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 621 days.

(21) Appl. No.: 13/929,190

(22) Filed: Jun. 27, 2013

(65) Prior Publication Data

US 2015/0006083 A1 Jan. 1, 2015

(51) Int. Cl.
*G01V 1/40* (2006.01)
*G01V 1/30* (2006.01)

(52) U.S. Cl.
CPC ...... *G01V 1/308* (2013.01); *G01V 2210/6122* (2013.01)

(58) Field of Classification Search
CPC .................. G01V 1/308; G01V 2210/6122
See application file for complete search history.

(56) References Cited

U.S. PATENT DOCUMENTS

| | | | | |
|---|---|---|---|---|
| 4,969,130 A * | 11/1990 | Wason | ............... | E21B 49/00 367/37 |
| 5,018,112 A * | 5/1991 | Pinkerton | ............ | G01V 1/34 367/38 |
| 5,148,406 A * | 9/1992 | Brink | ................. | G01V 1/28 367/20 |
| 8,908,474 B2 * | 12/2014 | Chu | ................. | G01V 11/00 367/73 |

FOREIGN PATENT DOCUMENTS

WO 2008/140655 A1 11/2008

OTHER PUBLICATIONS

Huang, Yi, et al.; "Direct Correlation of 4D Seismic with Well Activity for a Clarified Dynamic Reservoir Interpretation"; 2012, Geophysical Prospecting, vol. 60, pp. 293-312.
Landro, Martin; Discrimination Between Pressure and Fluid Saturation Changes from Time-Lapse Seismic Data; May-Jun. 2001, Geophysics, vol. 66, No. 3, pp. 836-844.
International Search Report, issued on Dec. 18, 2014, during the prosecution of International Application No. PCT/US2014/030985.
Written Opinion of the International Searching Authority, issued on Dec. 18, 2014, during the prosecution of International Application No. PCT/US2014/030985.

* cited by examiner

*Primary Examiner* — Elias Desta

(57) ABSTRACT

A method for mapping remaining hydrocarbon resources in a subsurface reservoir, includes obtaining a map of seismic amplitude difference over a time period based on a survey of the subsurface reservoir, generating an expected trend dataset for the reservoir based on one or more non-water saturation effects detected over the time period by one or more wellbore surveillance techniques at one or more locations in the reservoir, correcting the map of seismic amplitude difference, at least in part, on the expected trend dataset to generate a corrected seismic amplitude map, and using the corrected seismic amplitude difference map to generate a map representative of remaining hydrocarbon resources in the reservoir. Embodiments include a system for performing the method and a medium containing computer executable software instructions for performing the method.

20 Claims, 10 Drawing Sheets

SYSTEM AND METHOD FOR REMAINING RESOURCE MAPPING

TECHNICAL FIELD

The present invention relates generally to mapping resources in a hydrocarbon reservoir and more particularly to the use of adjusted seismic data for mapping remaining resources after initial exploitation of the reservoir.

BACKGROUND

In the petroleum industry, seismic prospecting techniques are commonly used to aid in the search for and the evaluation of subterranean hydrocarbon deposits. In seismic prospecting, one or more sources of seismic energy emit waves into a subsurface region of interest such as a geologic formation. These waves enter the formation and may be scattered, e.g., by reflection or refraction, by subsurface seismic reflectors (i.e., interfaces between underground formations having different elastic properties). The reflected signals are sampled or measured by one or more receivers, and the resultant data, e.g., amplitude and phase information, are recorded. The recorded samples may be referred to as seismic data or a set of "seismic traces." The seismic data may be analyzed to extract details of the structure and properties of the region of the earth being explored.

Seismic imaging techniques for reservoir mapping may include taking multiple images over time in order to observe evolution of the subsurface. This method may be referred to as four dimensional (4D) mapping or time-lapse imaging. In 4D mapping, the seismic data is acquired, processed and interpreted on an iterative basis over a region of interest. Typically, such an approach is used in an area known to be undergoing change, such as a reservoir that is subject to production and/or injection processes. In this way, changes due to the exploitation of the reservoir may be observed, and conclusions regarding future productivity of the reservoir may be reached.

SUMMARY

A method for mapping remaining hydrocarbon resources in a subsurface reservoir, includes obtaining a map of seismic amplitude difference over a time period based on a survey of the subsurface reservoir, generating an expected trend dataset for the reservoir based on one or more non-water saturation effects detected over the time period by one or more wellbore surveillance techniques at one or more locations in the reservoir, correcting the map of seismic amplitude difference, at least in part, on the expected trend dataset to generate a corrected seismic amplitude map, and using the corrected seismic amplitude difference map to generate a map representative of remaining hydrocarbon resources in the reservoir.

A system for performing the foregoing method includes at least one processor and at least one associated memory and modules configured to execute a method including obtaining a map of seismic amplitude difference over a time period based on seismic imaging of the subsurface reservoir, generating expected trend data for the reservoir based on non-water saturation effects detected over the time period by wellbore surveillance techniques at locations in the reservoir, correcting the map of seismic amplitude difference, at least in part, on the expected trend data, and using the corrected seismic amplitude difference map to generate a map representative of remaining hydrocarbon resources in the reservoir.

A non-transitory processor readable medium containing computer readable software instructions used to perform the foregoing method.

DETAILED DESCRIPTION

Time-lapse, or 4D, seismic imaging may be used to map changes in a reservoir over time. Because the seismic image depends in part on water saturation ($S_w$), changes in oil cut or percentage as a function of $S_w$ may be derived based on changes over time in the seismic response of the reservoir. As used herein, the term "oil cut" refers to the percentage of hydrocarbons present in the reservoir. Using this information, field managers may determine regions of the reservoir that are water swept, or regions that may be likely to include bypassed oil.

Figure 1:
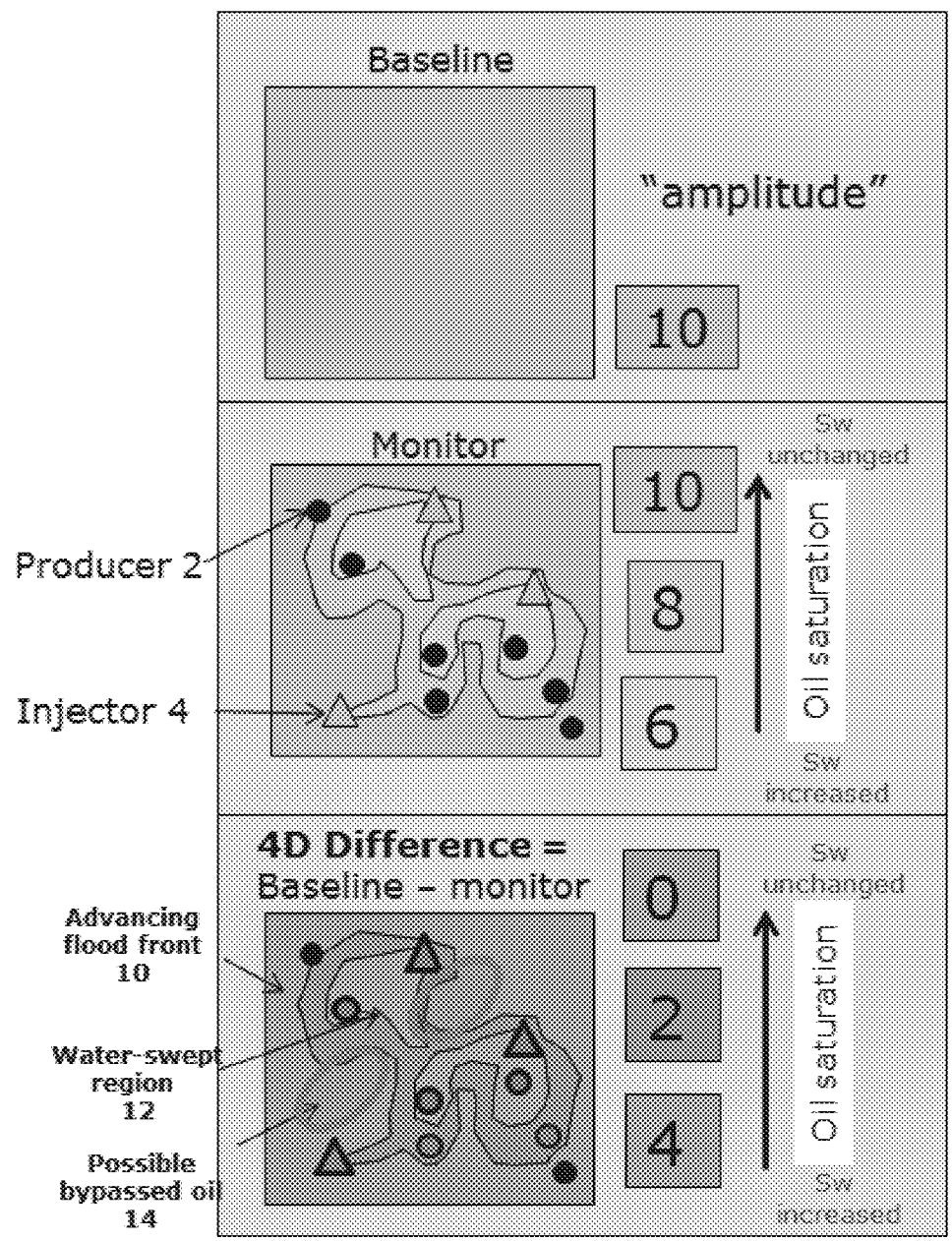
FIG. 1 schematically illustrates changes in amplitude in a simulated 4D seismic survey of a region as a result of changes in oil and water saturation.

An example of this is illustrated schematically in FIG. 1. An exemplary baseline case shows a seismic amplitude of 10 throughout the surveyed range. As will be appreciated, such a baseline survey would generally show variation, but for the purpose of illustration, the seismic data is initially a constant value.

After a period of time, a second monitor survey is taken and variations in the initially constant amplitude data may be observed. Referring still to FIG. 1, a number of producer wells 2 and injector wells 4 are shown. In some regions surrounding the wells, the amplitude remains unchanged at 10, while in other regions, amplitude has been reduced to 8 or 6. These results may be interpreted as meaning that $S_w$ is unchanged where the amplitude is unchanged and increased where amplitude is decreased for the present example of an AVO Class III reservoir.

The monitor amplitudes may be subtracted from the baseline amplitudes to produce a 4D difference amplitude map. Thus, for the outer region, where amplitude was unchanged, a zero value is assigned, and the other regions are similarly treated.

Interpretations of the difference map may include location of an advancing flood front 10, a water-swept region 12 and the location of potential bypassed oil 14. High difference values may be interpreted as water swept regions, while low difference regions may indicate a high oil cut in areas not yet swept by water. The interpretation of bypassed oil at location 14 may be based on the apparent lack of penetration of the flood front into regions that may otherwise be surrounded by apparent injected water flow.

To further evaluate and quantify the 4D seismic response, a first step is to determine an expected trend so as to properly correlate the observed amplitude differences with actual changes in saturation via surveillance data acquired from wells in the reservoir. This correlation process is schematically illustrated in FIG. 2.

Figure 2:
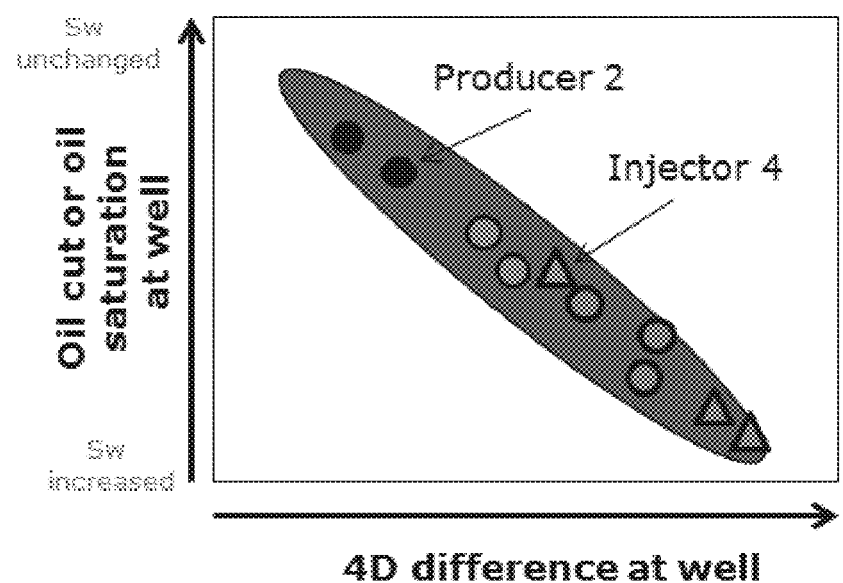
FIG. 2 illustrates an expected trend correlating oil saturation with amplitude difference signal (derived from compressional data) in a 4D survey.

In FIG. 2, for each well location of FIG. 1, a point is defined in an oil cut—4D difference plane. That is, oil cut for each well is plotted against the amplitude difference. For reference, the particular producer 2 and injector 4 from FIG. 1 are identified in FIG. 2. This plot will show a trend that provides a correlation between amplitude difference and oil cut. As will be appreciated, oil cut for the wells may be determined based on actual data obtained from well monitoring techniques known to the skilled artisan. As will be further appreciated, a real-world example is unlikely to show a straight-line trend such as is illustrated here. However, so long as a reasonable correlation may be observed, the present technique may be applied. In general, the expectation is that increasing amplitude difference may correlate to lower oil cut and increased $S_w$. For those wells falling on or near the trend line, the 4D difference will generally provide useful information regarding changes in $S_w$.

Once a trend line is determined, it may be possible to identify particular wells that deviate significantly from the trend (e.g., high oil cut and high difference value). As will be appreciated, 4D difference values are not likely to be predictive with regard to evaluating current water saturation for these wells. Various explanations may be possible. For example, if an area is isolated from the water flood zones, e.g., by an impermeable formation or fault zone, a high difference value is not likely to be explained by $S_w$ changes, but may instead be due to pressure changes in that part of the reservoir.

Figure 3:
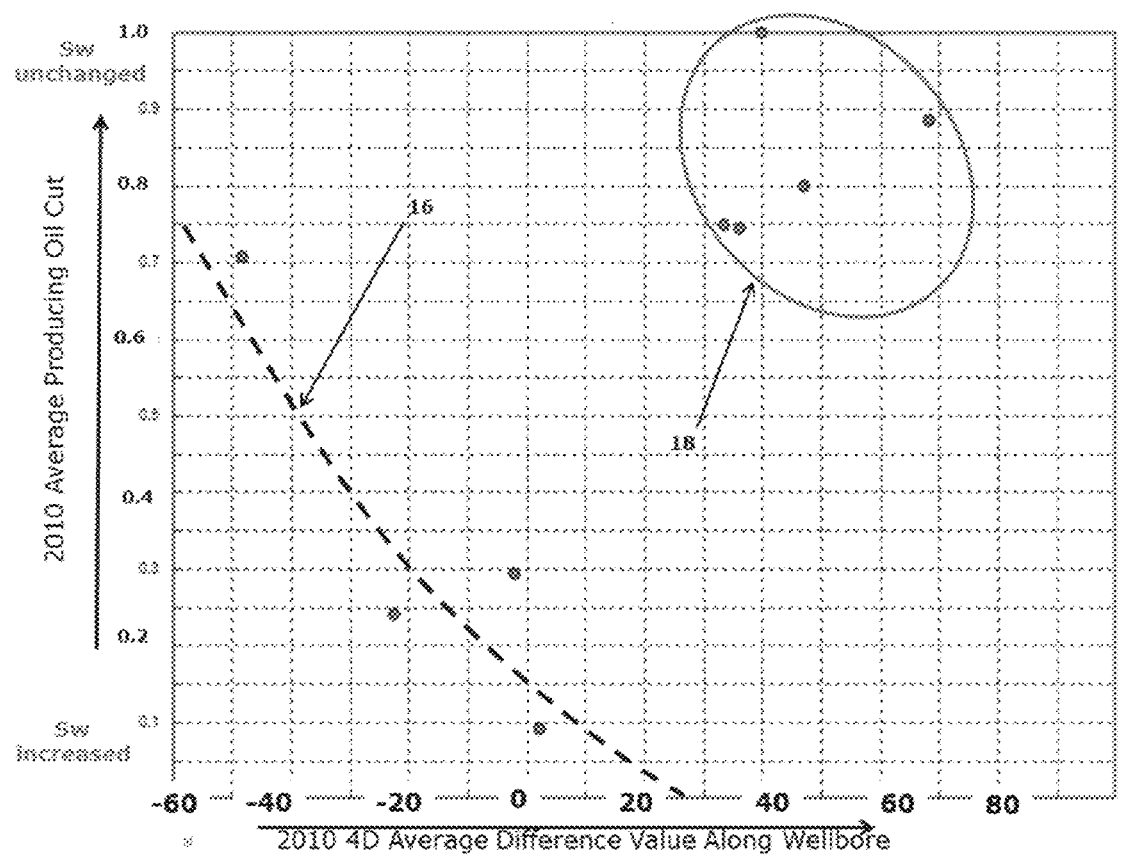
FIG. 3 is a plot of oil cut against 4D seismic amplitude difference value for several well sites.

An example is illustrated in FIG. 3. As shown in the Figure, one group of wells lies close to a trend line 16 aligned with the trend diagrammatically illustrated in FIG. 2. In the example, these wells are in a region of a field in which waterflooding has been successfully applied. In this region, the expectation is that any increase in 4D difference corresponds to increase in $S_w$, i.e., decreased oil cut. On the other hand, another group of wells in the region 18 shows both high oil cut and high seismic difference. For these wells, difference value does not appear to be a strong predictor of $S_w$. In the example field, these wells are in a portion of the field that is apparently isolated from the injectors that have successfully flooded the region in which the trend line 16 wells lie.

As can be seen from this example, other changes in the subsurface makeup can produce changes in seismic response that are similar to the changes produced by changes in water saturation, masking the contribution of $S_w$ changes alone on seismic difference surveys. In particular, pressure changes, gas saturation changes, and variations in net-to-gross may affect the amplitude of seismic signals. Pressure changes, in particular, are of interest because the very processes that are responsible for the changes in water saturation, i.e., water injection and oil/gas production, have a tendency to change pressure in the regions surrounding injection and production wells. Therefore, understanding the pressure changes in the reservoir may allow for a useful approach to correction of the $S_w$ data.

Figure 4:
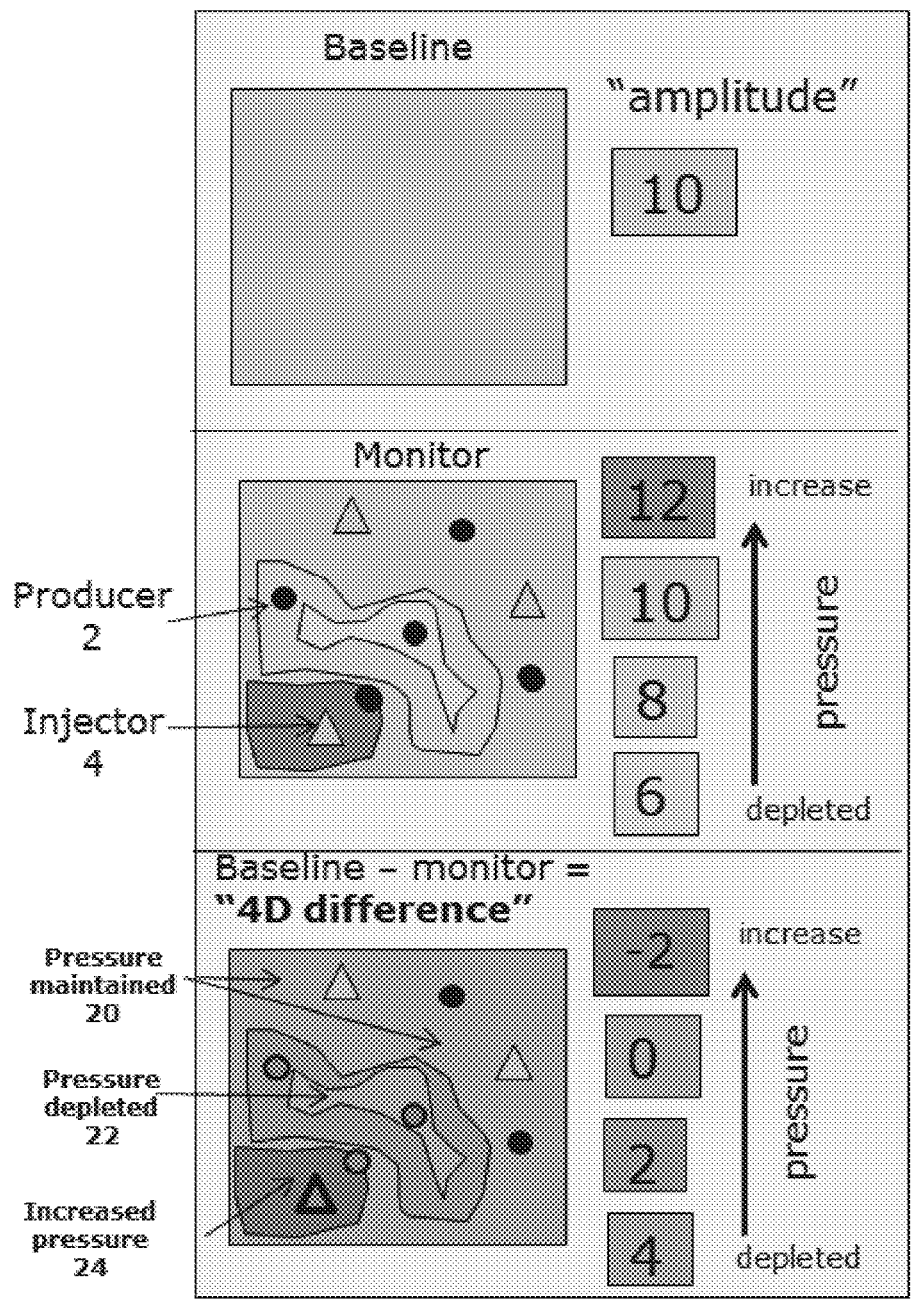
FIG. 4 schematically illustrates changes in amplitude for a 4D seismic survey (derived from compressional data) resulting from pressure changes in a region corresponding to the region illustrated in FIG. 1.

FIG. 4 schematically illustrates effects of pressure changes on 4D difference data in the reservoir. These changes can be observed on the seismic difference map calculated relative to a baseline measurement. The changes in pressure can be measured at each well by suitable surveillance techniques and compared with the 4D difference data to establish a trend of expected impact on the difference data as a result of the pressure changes.

As shown in FIG. 4, the region 20 does not experience pressure changes over the time interval between the baseline and monitor surveys. On the other hand, the region 22 near certain of the producers shows some pressure depletion, while the region 24 near the injector 4 is a region of increased pressure. The increased pressure in the region 24 may be explained by some portion of the formation that prevents injected water from flowing freely. That is, such an increase in pressure may represent poor connectivity within the field. In the example, pressure is well maintained near the injection wells in the north-northwest and east-northeast of the field, while pressure in the region between those injectors and the compartmentalized injector is depleted. This conclusion may be confirmed, for example, by characterizing facture density and/or permeability in this region. Where permeability is low, compartmentalization is a logical conclusion.

Figure 5:
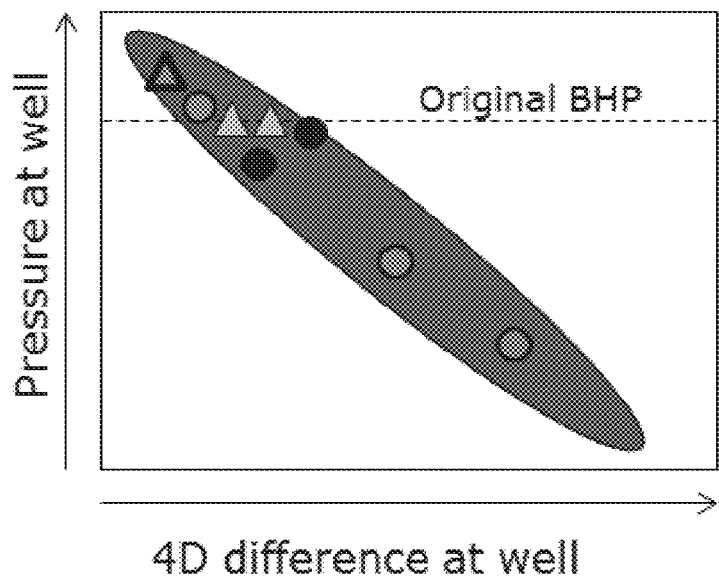
FIG. 5 illustrates an expected trend correlating pressure with amplitude difference.

FIG. 5 is a cross plot of pressure at the well vs. the 4D seismic difference at that well location derived from the wells illustrated in FIG. 4. In the illustrated example, a clear trend is observed, and the correlation between pressure and seismic difference is quite high.

Figure 6:
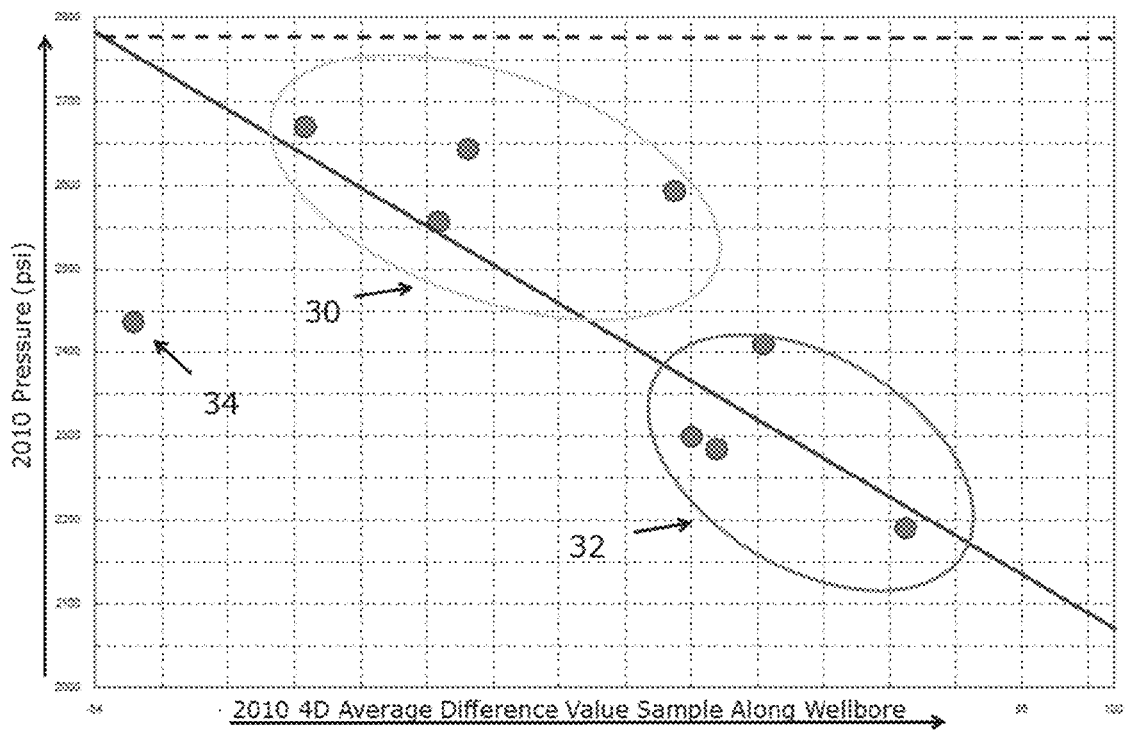
FIG. 6 is a plot of pressure against difference value for several well sites.

FIG. 6 is similar to FIG. 3, but illustrating pressure vs. 4D seismic average difference in a number of actual producing wells. A first group of wells 30 are in the same waterflood region as the trend line wells of FIG. 3. In this region, there is adequate pressure support as oil is recovered, and the difference in the seismic amplitude is primarily due to change in $S_w$. A second group of wells 32, corresponding substantially to the group 18 from FIG. 3, show low pressure and high seismic difference. In this group, the difference in seismic amplitude is most likely the result of low pressure, and not due to water sweep as in group 30. One last well 34 is located well off of the trend line and shows a low difference signal as well as some pressure depletion. This well is located near an edge of the pressure supported water flood region, and appears to be only partially supported.

In view of the foregoing, it has been determined that correction factors may be generated and applied to the 4D survey data in order to remove non-water saturation effects. In this regard, such non-water saturation effects may include without limitation, one or more of pressure, gas saturation and net-to-gross variability, or combinations thereof may be used to generate corrections. This approach may result in a reduction of computing overhead as compared to, for example, performing an entirely new inversion on the seismic data.

Figure 7A:
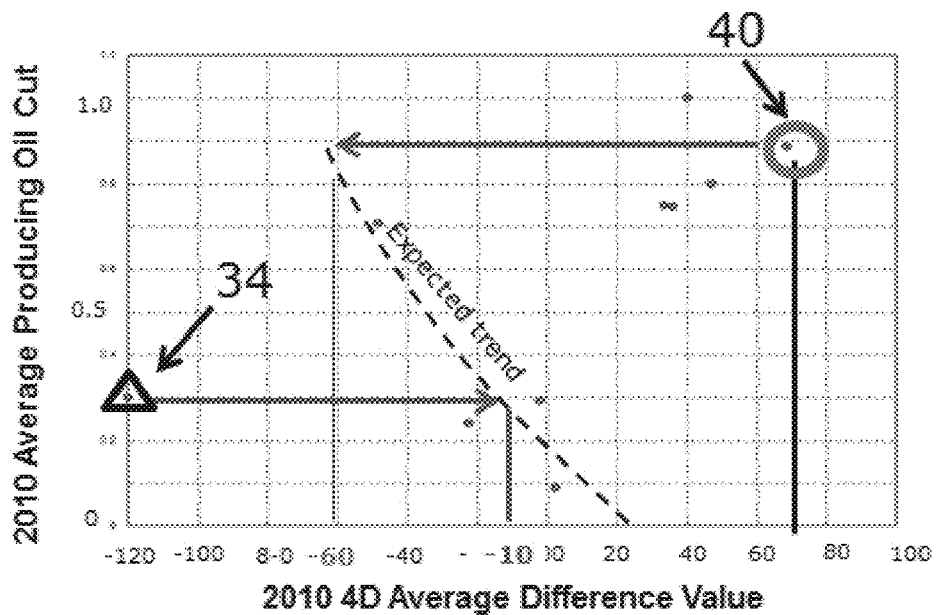
FIG. 7a illustrates determining a correction factor for off-trend wells.
Figure 7B:
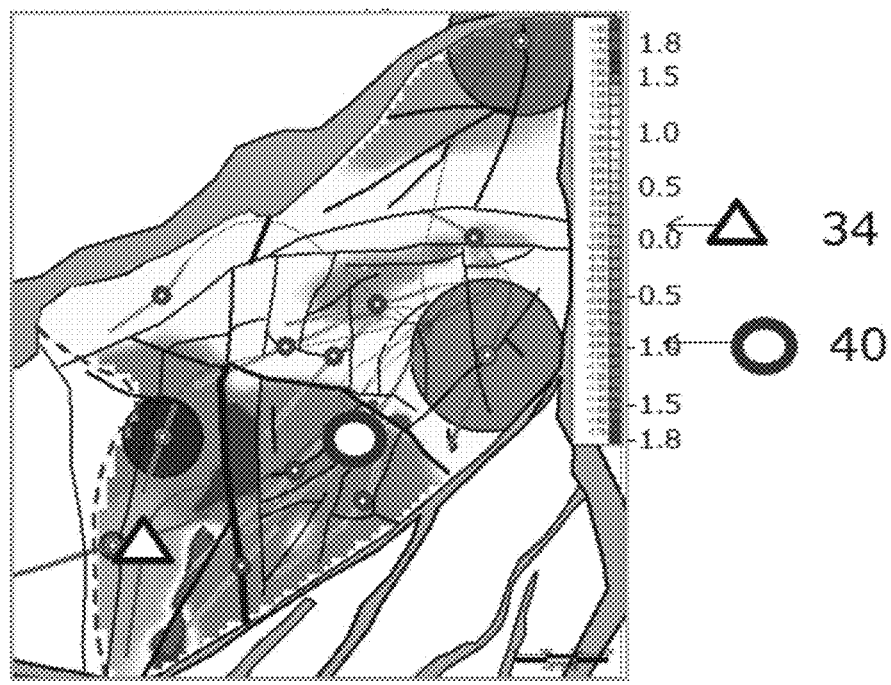
FIG. 7b illustrates a correction factor map in accordance with an embodiment.
Figure 7C:
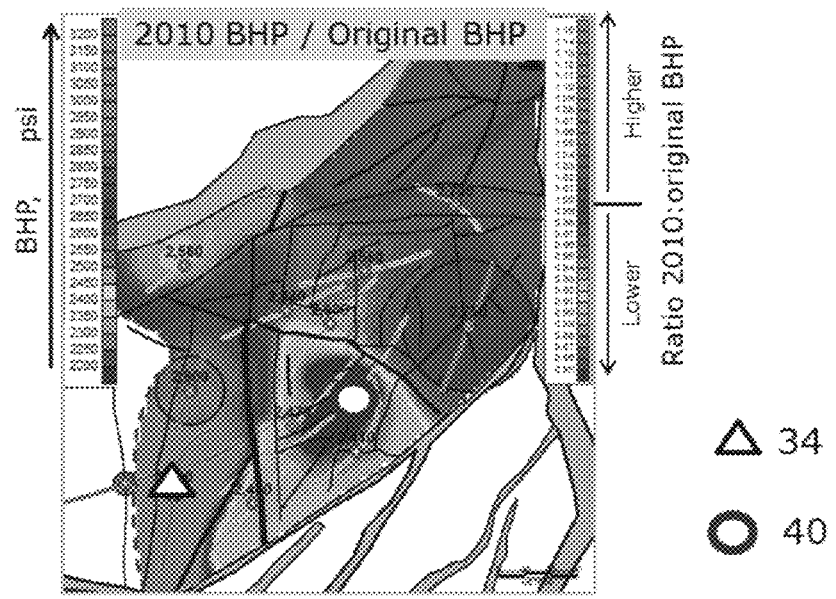
FIG. 7c illustrates a map showing ratios of pressures and fault pattern trends.
Figure 8:
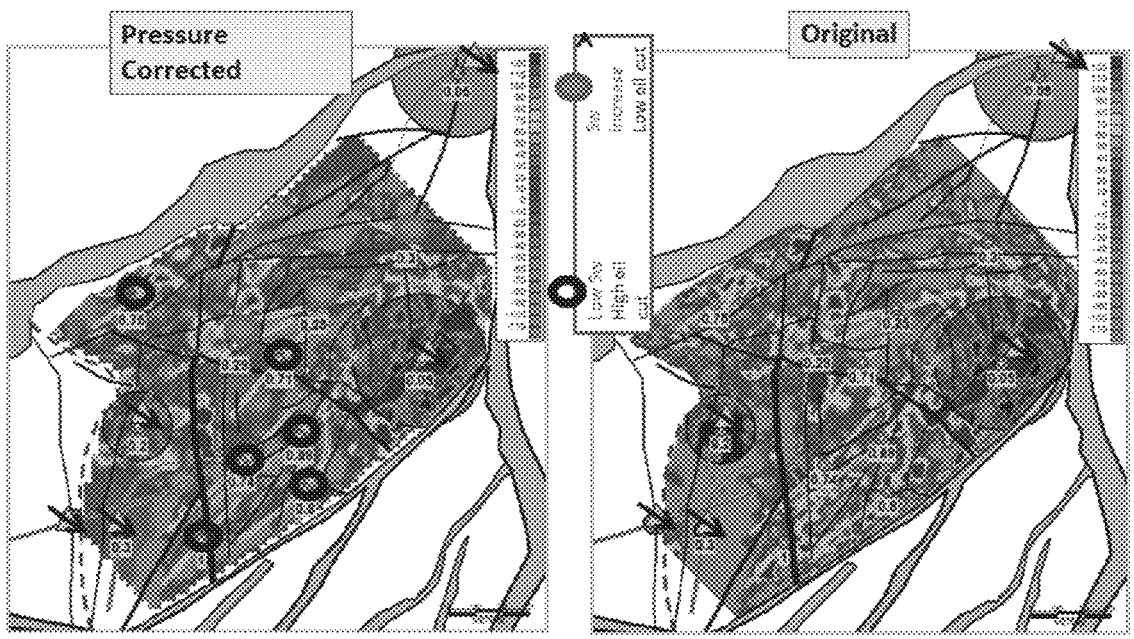
FIG. 8 shows an original difference map and a corrected map generated based on the original difference map and calculated correction factors.

An example of a method of calculating a correction equation for two wells that each lie away from the expected trend line is illustrated schematically in FIG. 7a. A first well 40 lies in a region of high oil cut and high 4D difference. This well in fact is one of the pressure depleted wells 32 of FIG. 6. For this well, a corrected difference may be calculated according to equation 1:

$$(CF)*(\text{ObservedDiff}) = \text{Corrected Diff} \qquad (\text{Eqn. 1})$$

Where CF is a correction factor and Observed Diff is a 4D difference initially measured from the seismic monitor survey and Corrected Diff is a difference value expected for that well as determined by the trend line. For well 40, this equation is (CF)*65=−60, which can be solved for CF to yield a value of −0.92. Applying the Eqn. 1 to the other off-trend well 34 gives a value of 0.08. For each of a full field of wells, a similar correction factor may be calculated, and a correction factor map may be generated. FIG. 7b is the resultant correction factor map, showing the wells 34 and 40 of FIG. 7a both of which were used to establish the values. The correction factor map can be constrained away from wellbore control with various reservoir data, including fault trace patterns or current reservoir pressure, as illustrated in FIG. 7c. Once the correction factor map is generated, a grid-to-grid multiplication of the original difference map and the correction factor map may be performed to produce a pressure corrected difference map. This is illustrated in FIG. 8, in which the original difference map is on the right and the corrected map is on the left. In both maps, each well is labeled with its respective current producing oil cut value, where it is observed that low oil cuts now correspond consistently with higher seismic difference values, as established in the expected trend shown in FIG. 2. Oil cuts displayed in FIG. 8 are measured at the producers and estimated at injectors based on the cumulative volume of water injected at each well.

In the pressure corrected map, FIG. 8, the wells that are represented as open circles are those that are relatively low oil cut (e.g., <30%) and high difference. Those represented by filled circles are those with high oil cut (e.g., >75%) and low difference values.

Figure 9A:
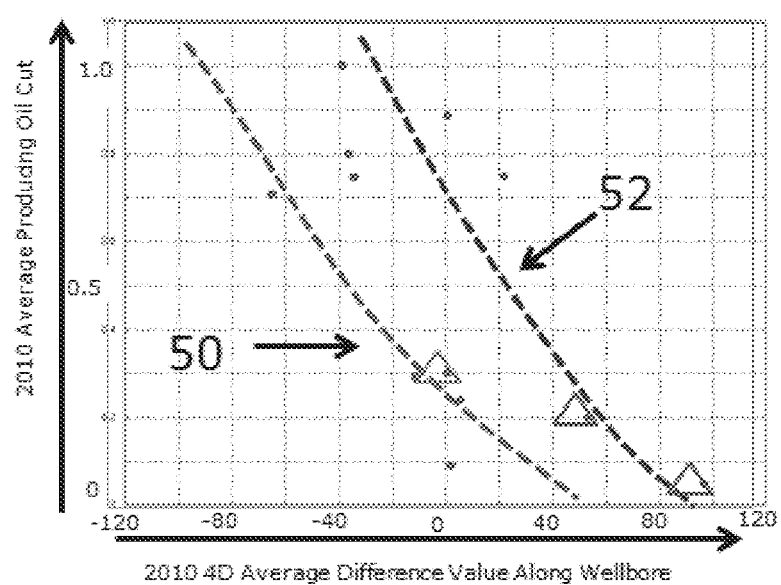
FIG. 9a shows a correlation between oil cut and pressure corrected 4D difference value.
Figure 9B:
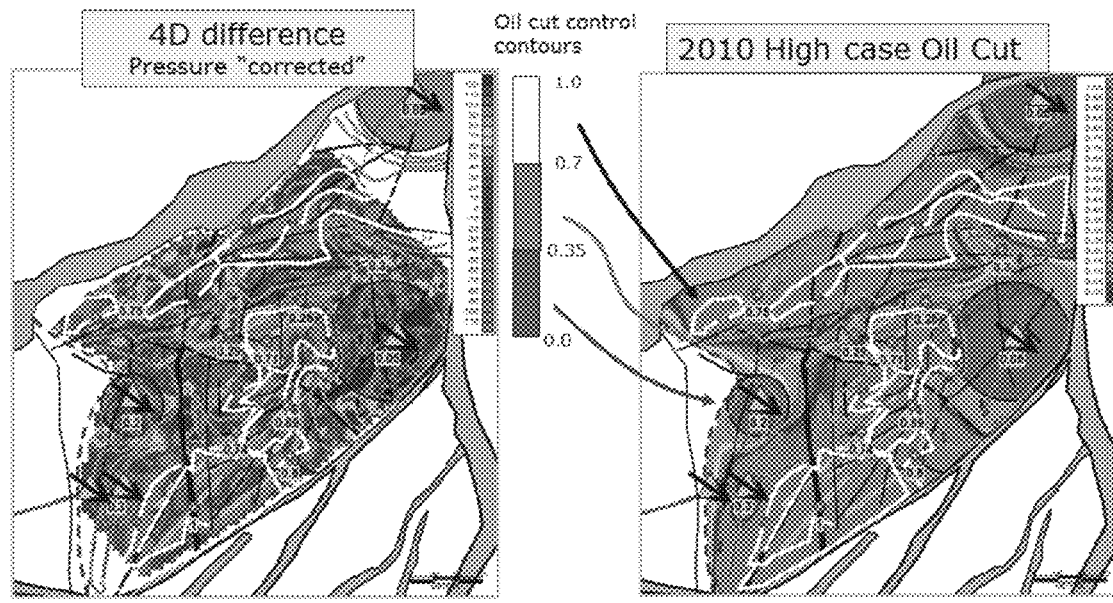
FIG. 9b shows a pressure corrected 4D difference map and a derived oil cut map.

Once the pressure corrected map is generated, a new correlation between oil cut and average difference values is generated. An example is shown in FIG. 9a. As may be observed, the corrected values tend more to follow a trend, but some degree of scatter is still evident. The resulting plot may be seen as showing a low trend 50 and a high trend 52. The low trend represents a model in which a lower oil cut is correlated to any given difference value while the high trend is one in which a higher oil cut is correlated to the same difference value. These correlations can be used as map control elements and are displayed as contour lines for the high trend case on the 4D difference and oil cut maps in FIG. 9b. The resulting oil cut map can be used as a proxy for current oil and water saturation distribution in the reservoir.

In generating oil cut maps, the oil cut and injection volume data are used in accordance with usual methods. Likewise, information regarding the subsurface geology and structure may be used. Then, using the 4D difference values and the trends determined previously, an ensemble of cases may be developed and evaluated.

The low trend corresponds to an assumption that there is less currently remaining resource, and that the reservoir is producing in a relatively even manner. The water flood front contour will generally represent an even sweep through the reservoir. This approach tends to produce a good estimate of where within the reservoir injection water has progressed.

The high trend corresponds to a larger estimate of remaining resource, and inefficient and uneven water sweeping of the region. Contours developed under this assumption tend to exhibit fingering or coning, and the resulting map will tend to identify areas where bypassed resources may lie.

Figure 10A:
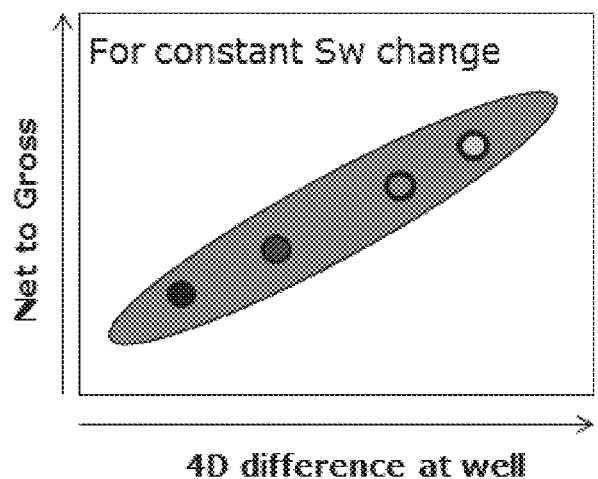
FIG. 10a illustrates an expected trend line correlating net-to-gross with difference value.

Just as pressure may be used to generate correction factors as described above, net-to-gross or gross Phi-H may similarly be used. For a constant value of $S_w$, low net-to-gross will result in lower difference values than will high net-to-gross values. This results in the expected trend illustrated in FIG. 10a. Once expected trend information is generated, correction factors may be generated and a correction map may be applied to the seismic data in an approach that parallels that taken with the pressure data. Gas saturation data may likewise be used, wherein the expected trend is that a decrease in gas saturation results in a higher difference value and an increase in gas saturation results in a relatively lower difference value.

Figure 10B:
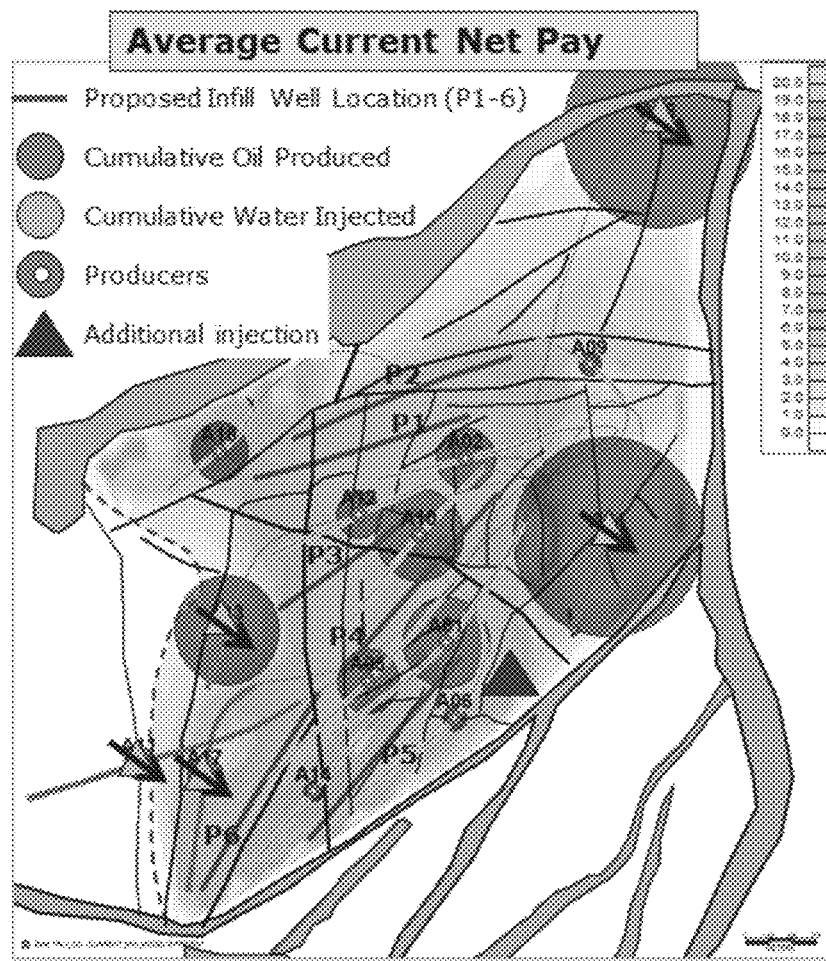
FIG. 10b illustrates an estimated average current net pay map.

The resulting oil cut maps may be used to generate other displays, maps, or analyses that may be used for reservoir management decision-making. For example, a current net pay map may be developed by integrating the oil cut maps with fractional flow curves generated from relative permeability data and original net pay maps as shown in FIG. 10b. Recovery factor analysis from mapped swept pore volume may be compared to analog data and waterflood recovery equations as a quality control step.

Based on assessment of incremental potential (i.e., potential resource recovery beyond that that merely represents accelerated recovery), locations for potential infill wells may be evaluated. This assessment may include, for example, Monte Carlo simulation based on the high and low cases of net pay maps generated based on the corrected difference maps, recovery factor analysis, and remaining reserve estimates for active production wells. For each potential infill well, low, mid and high estimates may be generated, so that a preferred location may be selected.

Figure 11:
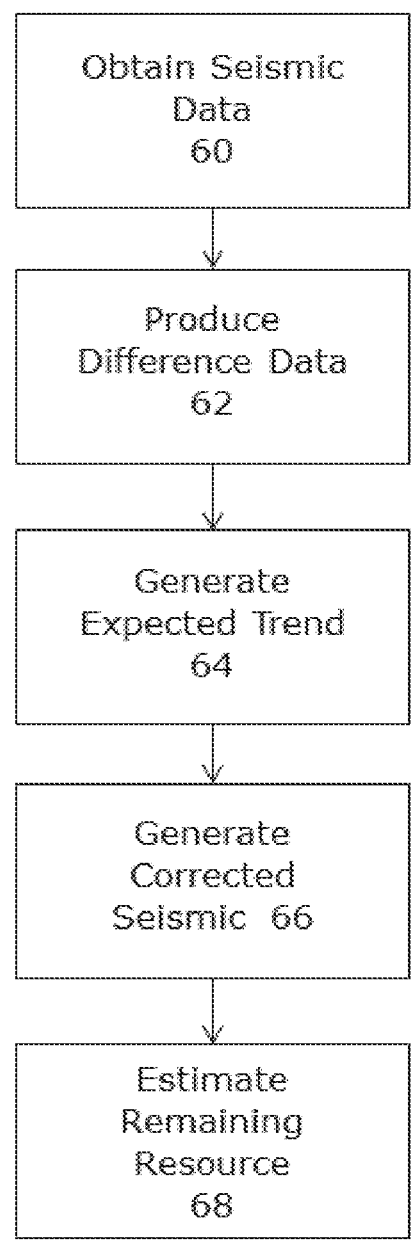
FIG. 11 is a flowchart illustrating a method in accordance with an embodiment.

FIG. 11 is a flowchart illustrating a method in accordance with an embodiment. A seismic data set is obtained 60 over a selected time interval. This data set is used to produce difference data 62, representing changes in the seismic response as a result of production of reservoir fluids over the time interval. As will be appreciated, the actual acquisition of seismic data, along with various processing techniques, may be performed by a third-party vendor, such that obtaining data should be understood to encompass direct acquisition as well as retrieval or receipt of data from a storage medium or database.

Additional data, representing measurements of various physical conditions that tend to affect seismic amplitude measurements, is used to generate expected trend data 64. This data may be, for example, based on measurements taken through borehole surveillance techniques, and may include water and oil saturation, downhole pressures, gas saturation, and net-to-gross measurements (e.g., net sand to shale, net effective porosity-height to net height, etc.).

A corrected seismic image is generated 66 using correction factors derived from the expected trend data. The corrected seismic image may be generated by cross multiplication of values of the correction factors with values of amplitude difference from the initial seismic map.

The corrected seismic image is then used to produce a map of estimated remaining hydrocarbon resources 68 for the reservoir. This resulting map may be used in selecting additional techniques for increasing and/or accelerating production from the reservoir, as discussed above.

The above described methods can be implemented in the general context of instructions executed by a computer. Such computer-executable instructions may include programs, routines, objects, components, modules, data structures, and computer software technologies that can be used to perform particular tasks and process abstract data types when executed on one or more processors. Software implementations of the above described methods may be coded in different languages for application in a variety of computing platforms and environments. It will be appreciated that the scope and underlying principles of the above described methods are not limited to any particular computer software technology.

Moreover, those skilled in the art will appreciate that the above described methods may be practiced using any one or a combination of computer processing system configurations, including, but not limited to, single and multi-processor systems, hand-held devices, programmable consumer electronics, mini-computers, or mainframe computers. The above described methods may also be practiced in distributed computing environments where tasks are performed by servers or other processing devices that are linked through a one or more data communications networks. In a distributed computing environment, program modules may be located in both local and remote computer storage media including memory storage devices.

Also, an article of manufacture for use with a computer processor, such as a CD, pre-recorded disk or other equivalent devices, could include a computer program storage medium and program means recorded thereon for directing the computer processor to facilitate the implementation and practice of the above described methods. Such devices and articles of manufacture also fall within the spirit and scope of the present invention.

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

While in the foregoing specification this invention has been described in relation to certain preferred embodiments thereof, and many details have been set forth for the purpose of illustration, it will be apparent to those skilled in the art that the invention is susceptible to alteration and that certain other details described herein can vary considerably without departing from the basic principles of the invention. For example, the invention can be implemented in numerous ways, including for example as a method (including a computer-implemented method), a system (including a computer processing system), an apparatus, a computer readable medium, a computer program product, a graphical user interface, a web portal, or a data structure tangibly fixed in a computer readable memory.

What is claimed is:

1. A method for mapping remaining hydrocarbon resources in a subsurface reservoir, comprising:
   (a) obtaining a map of four dimensional (4D) seismic amplitude difference over a time period based on a survey of the subsurface reservoir, wherein the map of 4D seismic amplitude difference represents changes in seismic response as a result of production of reservoir fluids from the subsurface reservoir over the time period, and wherein the map of 4D seismic amplitude difference is based on seismic data from seismic waves generated by one or more sources of energy and measured by one or more receivers;
   (b) generating, with a processor, expected cross plot trends to correlate the map of 4D seismic amplitude difference versus oil cut in the subsurface reservoir based on one or more non-water saturation effects detected over the time period by one or more wellbore surveillance direct measurements from at least one sensor of various reservoir properties at one or more locations in the subsurface reservoir;
   (c) correcting, with a processor, the map of 4D seismic amplitude difference based, at least in part, on the expected cross plot trends to generate a corrected 4D seismic amplitude map; and
   (d) using the corrected 4D seismic amplitude difference map to generate, with a processor, a map representative of remaining hydrocarbon resources in the subsurface reservoir, wherein the map representative of remaining hydrocarbon resources in the subsurface reservoir will allow exploration and development of the subsurface reservoir.

2. The method of claim 1, wherein the one or more non-water saturation effects detected by the one or more wellbore surveillance direct measurements are selected from the group consisting of: pressure, net-to-gross, gas saturation, and combinations thereof.

3. The method of claim 1, wherein the expected cross plot trends comprise a range of expected trends, and the correcting the map comprises generating an ensemble of water saturation change maps based on the range of expected trends.

4. The method of claim 1, further comprising defining one or more regions likely to represent high levels of water encroachment in the corrected map.

5. The method of claim 1, further comprising defining one or more regions likely to represent bypassed hydrocarbon resources.

6. The method of claim 1, further comprising identifying one or more regions of low connectivity in the subsurface reservoir.

7. The method of claim 2, wherein the pressure comprises well bore pressure logging measurements.

8. The method of claim 1, wherein the expected cross plot trends are further generated on the basis of additional surveillance data for the subsurface reservoir.

9. The method of claim 1, further comprising using structural and geologic trend data for contouring corrections used in the correcting.

10. The method of claim 1, further comprising using the corrected map to determine an incremental value of a recovery value for a region of the subsurface reservoir for applying a selected reservoir management technique to obtain an improved ultimate recovery over a baseline recovery case.

11. The method of claim 1, further comprising identifying a location within the subsurface reservoir for applying a selected reservoir management technique.

12. The method of claim 11, wherein the reservoir management technique is selected from the group consisting of: adding pressure by injection, sidetracking to break a compartment, and drilling a new production well.

13. A system for mapping remaining hydrocarbon resources in a subsurface reservoir, comprising:
   at least one processor; and
   at least one associated memory storing executable code, which, when executed by the at least one processor, cause the processor to perform:
      obtaining a map of four dimensional (4D) seismic amplitude difference over a time period based on a survey of the subsurface reservoir, wherein the map of 4D seismic amplitude difference represents changes in seismic response as a result of production of reservoir fluids from the subsurface reservoir over the time period, and wherein the map of 4D seismic amplitude difference is based on seismic data from seismic waves generated by one or more sources of energy and measured by one or more receivers;
      generating expected cross plot trends to correlate the map of 4D seismic amplitude difference versus oil cut in the subsurface reservoir based on one or more non-water saturation effects detected over the time period by one or more wellbore surveillance direct measurements from at least one sensor of various reservoir properties at one or more locations in the subsurface reservoir;
      correcting the map of 4D seismic amplitude difference based, at least in part, on the expected cross plot trends to generate a corrected 4D seismic amplitude map; and
      using the corrected 4D seismic amplitude difference map to generate a map representative of remaining hydrocarbon resources in the subsurface reservoir, wherein the map representative of remaining hydrocarbon resources in the subsurface reservoir will allow exploration and development of the subsurface reservoir.

14. The system of claim 13, wherein the one or more non-water saturation effects detected by the one or more wellbore surveillance direct measurements are selected from the group consisting of: pressure, net-to-gross, gas saturation, and combinations thereof.

15. The system of claim 13, wherein the expected cross plot trends comprise a range of expected trends, and the correcting the map comprises generating an ensemble of water saturation change maps based on the range of expected trends.

16. The system of claim 13, wherein the corrected map is used to determine an incremental value of a recovery value for a region of the subsurface reservoir for applying a selected reservoir management technique to obtain an improved ultimate recovery over a baseline recovery case.

17. A non-transitory processor readable medium containing computer readable software instructions for performing a method comprising:
   obtaining a map of four dimensional (4D) seismic amplitude difference over a time period based on a survey of the subsurface reservoir, wherein the map of 4D seismic amplitude difference represents changes in seismic response as a result of production of reservoir fluids from the subsurface reservoir over the time period, and wherein the map of 4D seismic amplitude difference is based on seismic data from seismic waves generated by one or more sources of energy and measured by one or more receivers;
   generating expected cross plot trends to correlate the map of 4D seismic amplitude difference versus oil cut in the subsurface reservoir based on one or more non-water saturation effects detected over the time period by one or more wellbore surveillance direct measurements from at least one sensor of various reservoir properties at one or more locations in the subsurface reservoir;
   correcting the map of 4D seismic amplitude difference based, at least in part, on the expected cross plot trends to generate a corrected 4D seismic amplitude map; and
   using the corrected 4D seismic amplitude difference map to generate a map representative of remaining hydrocarbon resources in the subsurface reservoir, wherein the map representative of remaining hydrocarbon resources in the subsurface reservoir will allow exploration and development of the subsurface reservoir.

18. A medium as in claim 17, wherein the one or more non-water saturation effects detected by the one or more wellbore surveillance direct measurements are selected from the group consisting of: pressure, net-to-gross, gas saturation, and combinations thereof.

19. The medium of claim 17, wherein the expected cross plot trends comprise a range of expected trends, and the correcting the map comprises generating an ensemble of water saturation change maps based on the range of expected trends.

20. The medium of claim 17, wherein the corrected map is used to determine an incremental value of a recovery value for a region of the subsurface reservoir for applying a selected reservoir management technique to obtain an improved ultimate recovery over a baseline recovery case.

* * * * *